(12) United States Patent
Sanada et al.

(10) Patent No.: US 6,585,916 B2
(45) Date of Patent: Jul. 1, 2003

(54) ELECTRICALLY CONDUCTIVE PASTE AND ELECTRONIC ELEMENT

(75) Inventors: Yukio Sanada, Fukui (JP); Hiromasa Takahashi, Takefu (JP); Shinichiro Kuroiwa, Takefu (JP); Masaki Fujiyama, Moriyama (JP); Kunihiko Hamada, Moriyama (JP); Akira Otani, Yasu-gun (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 284 days.

(21) Appl. No.: 09/757,861

(22) Filed: Jan. 10, 2001

(65) Prior Publication Data

US 2001/0001481 A1 May 24, 2001

Related U.S. Application Data

(62) Division of application No. 09/262,572, filed on Mar. 4, 1999, now Pat. No. 6,197,221.

(30) Foreign Application Priority Data

Mar. 12, 1998 (JP) .............................. 10-61512

(51) Int. Cl.$^7$ .................................................. H01B 1/02
(52) U.S. Cl. .................... 252/518.1; 252/512; 252/520; 252/519.1; 252/519.5; 424/630; 424/641
(58) Field of Search .............................. 252/512, 518.1, 252/520, 519.5, 519.1; 424/630, 641

(56) References Cited

U.S. PATENT DOCUMENTS

| | | | | |
|---|---|---|---|---|
| 4,865,772 A | * | 9/1989 | Suehiro et al. | 252/518.1 |
| 5,250,229 A | * | 10/1993 | Hara et al. | 252/518 |
| 5,439,852 A | * | 8/1995 | Hormadaly | 501/26 |

* cited by examiner

Primary Examiner—Mark Kopec
Assistant Examiner—Derrick G. Hamlin
(74) Attorney, Agent, or Firm—Dickstein Shapiro Morin & Oshinsky LLP

(57) ABSTRACT

An electrically conductive paste which ensures formation of a dense electrode film even in a low-oxygen-concentration atmosphere without strict control of the atmosphere is described. The electrically conductive paste comprising Cu powder, glass frit and an organic binder resin, wherein the glass frit comprises Zn- and Cu-containing borosilicate glass and in the melt state has a contact angle with respect to Cu of 90° or less as measured in a nitrogen atmosphere.

8 Claims, 2 Drawing Sheets

ELECTRICALLY CONDUCTIVE PASTE AND ELECTRONIC ELEMENT

This is a divisional of application Ser. No. 09/262,572, filed Mar. 4, 1999 now U.S. Pat. No. 6,197,221.

BACKGROUND OF THE INVENTION

1. Field of the Invention

The present invention relates to an electrically conductive paste used for electronic elements having external electrodes, such as laminated capacitors, and to an electronic element having electrodes which are formed from the electrically conductive paste. In particular, the present invention relates to an electrically conductive paste predominantly containing Cu and to an electronic element having electrodes which are formed from the conductive paste.

2. Background Art

Conventionally, internal electrodes have been constituted of base metal materials such as Ni or Cu in order to reduce the production cost of laminated ceramic capacitors and other elements. Production of such electronic elements has involved formation of external electrodes by application and firing of an electrically conductive paste mainly comprising inexpensive copper powder. Briefly, outer electrodes are formed by application of an electrically conductive paste comprising Cu powder, zinc borosilicate glass frit, an organic binder resin and a solvent to an outer surface of a ceramic body in which an internal electrode was formed, and firing.

However, an electrically conductive paste applied to an outer surface of a ceramic body having an internal electrode made of a base metal must be fired in a low-oxygen-concentration atmosphere due to susceptibility to oxidation of the base metal such as Ni or Cu. When conventional electrically conductive pastes predominantly containing Cu are fired in a low-oxygen-concentration atmosphere, dense external electrodes might not be formed therefrom due to poor sinterability. Also, conventional electrically conductive pastes employing zinc borosilicate glass frit must be fired in a strictly controlled atmosphere but might not form dense external electrodes even when the atmosphere is strictly controlled.

SUMMARY OF THE INVENTION

Accordingly, an object of the present invention is to provide an electrically conductive paste which ensures formation of a dense electrode film without strict control of the firing atmosphere even when fired in a low-oxygen-concentration atmosphere and to provide an electronic element having electrodes which are formed from the conductive paste.

The electrically conductive paste in connection with the first aspect of the present invention is fired to constitute a dense electrode film, and functions as an electrode film, based on electric conductivity of the contained Cu powder. The conductive paste employs glass frit formed of Zn- and Cu-containing borosilicate glass and which when in a melt state has a contact angle with respect to Cu of 90° or less as measured in a nitrogen atmosphere.

The above described paste shows an excellent contacting property with an internal electrode and easily provides a dense electrode film on firing. Thus, dense external electrodes having excellent properties such as moisture resistance can be formed when the paste is used to form external electrodes of a ceramic electronic element.

In addition, the wettability of the glass frit with respect to Cu is enhanced to thereby realize coating of Cu powder with the melted glass component and speedy sintering. Therefore, even when the conductive paste is fired in a low-oxygen-concentration, e.g., an atmosphere having an oxygen concentration of ~1000 ppm, the Cu powder can be fired while oxidation thereof is prevented. In other words, formation of a dense electrode film can be ensured without strict control of the low-oxygen-concentration atmosphere.

In this case, the Zn and Cu contained in the borosilicate glass are generally present in the form of oxides among a variety of forms. Preferably, the Zn and Cu are contained in the following amounts: Zn is contained in an amount of about 2–40 mol %, and Cu is contained in an amount of between about 0.2 mol % and an amount that allows vitrification, in terms of ZnO and CuO, respectively. When the Zn content in terms of ZnO is less than about 2 mol % and glass frit is used as an external electrode of a ceramic electronic element, there is an inadequate reaction between the glass and the ceramic to cause possible reduction in bonding force of the electrodes to the ceramic. When the content is in excess of about 40 mol %, the wettability of the Cu powder with respect to the glass frit deteriorates to possibly result in failure to form a dense electrode film.

When the Cu content in terms of CuO is less than about 0.2 mol %, the wettability of the Cu powder with respect to the glass frit deteriorates to possibly result in failure to form a dense electrode film. No particular limitation is imposed on the upper limit of the Cu content. As described above, Cu may be incorporated in the glass frit in any amount so long as the Zn- and Cu-containing glass frit can vitrify.

When Zn and Cu are contained in the glass frit in the above-described specific amounts in terms of ZnO and CuO, Zn enhances the bonding property of the paste with ceramics to thereby provide external electrodes having an enhanced sealing property when the paste is used to form external electrodes of a ceramic electronic element, while the Cu component enhances the wettability of the glass frit with respect to Cu powder to thereby form a dense electrode film.

The electrically conductive paste predominantly containing Cu powder according to the present invention employs the above-described specific glass frit. No particular limitation is imposed on the other constitutional components. Therefore, Cu powder is incorporated in an appropriate amount so long as the Cu can function as an electrode film after firing. With regard to an organic binder resin constituting the conductive paste, there may be used conventionally employed organic binder resins such as acrylic resins and cellulose resins. The organic binder resins may be incorporated in any appropriate amount so long as the Cu powder and the glass frit can be retained in the unsintered conductive paste (i.e., conductive paste before subjected to sintering).

Furthermore, in order to facilitate application of the conductive paste, an appropriate solvent may be added in accordance with the organic binder employed. No particular limitation is imposed on the solvent, and an appropriate solvent may be used in accordance with the organic binders. The proportion of the solvent may be determined within the range that allows application of the paste.

The electronic element according to the second aspect of the present invention comprises a ceramic body having an internal electrode, and an external electrode provided on an outer surface of the ceramic body so as to electrically contact the internal electrode, wherein the external electrode is formed by application and firing of the above-described electrically conductive paste according to the present invention. In this case, no particular limitation is imposed on the ceramic body in which an internal electrode is formed, and examples of the ceramic bodies include those used in appropriate laminated ceramic electronic elements such as laminated ceramic capacitors, laminated ceramic varistors and laminated ceramic piezoelectric resonator elements. A plurality of internal electrodes laminated via a ceramic layer are not necessarily required; for example, the present invention is applicable to an electronic element employing a ceramic body having only one sheet internal electrode.

No particular limitation is imposed on the ceramic material constituting the ceramic body, and a variety of ceramic materials may be used as desired.

In the meantime, the material constituting the internal electrodes is not particularly limited, and in view of low cost, a base metal such as Ni or Cu is preferably used. When an internal electrode comprising such a base metal is formed in the ceramic body, an electrically conductive paste must be applied and fired in a low-oxygen-concentration atmosphere in order to prevent oxidation of the base metal. As described above, the conductive paste of the present invention forms a dense electrode film even when fired under a low-oxygen-concentration condition. Therefore, the conductive paste according to the present invention is appropriately applied to an electronic element having an internal electrode formed of a base metal such as Ni or Cu.

When an internal electrode material is a metal which easily forms alloys with Cu, such as Ni, Cu, Pd, Au, Fe, W or alloys thereof, the bonding strength between the external electrode and the internal electrode increases due to alloying of the internal electrode material with Cu in the external electrodes or with Cu in the glass frit.

Thus, an internal electrode formed of Ni or Cu is most preferable in that (1) such an internal electrode is inexpensive; (2) an external electrode formed of a dense sintered film can be formed thereon by use of the conductive paste according to the present invention, although the external electrode must be fired in a low-oxygen-concentration atmosphere; and (3) such an internal electrode has an excellent bonding property to external electrodes formed by use of the conductive paste according to the present invention.

According to the above described ceramic electronic elements, the Zn component enables formation of external electrode films strongly bonded to an electronic element body made of a ceramic element, and the Cu component in the glass frit enhances the wettability of the glass frit with respect to Cu powder to thereby form dense external electrodes. Therefore, the ceramic electronic elements have high reliability.

Other features and advantages of the present invention will become apparent from the following description of the invention which refers to the accompanying drawings.

DESCRIPTION OF THE PREFERRED EMBODIMENTS

Cu powder (70 wt. %), borosilicate glass in which ZnO or ZnO and CuO are incorporated in proportions shown in Table 1 (5 wt. %) and an organic vehicle (acrylic resin) (25 wt. %) were mixed and kneaded, to thereby prepare the electrically conductive pastes of Sample Nos. 1 through 10 shown in Table 1.

TABLE 1

| Sample No. | ZnO (mol %) | CuO (mol %) | Remarks |
|---|---|---|---|
| 1 | 20 | 0 | |
| 2 | 20 | 0.2 | |
| 3 | 20 | 0.5 | |
| 4 | 20 | 1 | |
| 5 | 20 | 10 | |
| 6 | 20 | 20 | |
| 7 | 1 | 1 | |
| 8 | 2 | 1 | |
| 9 | 40 | 1 | |
| 10 | 50 | 1 | Not vitrified |

Figure 1:
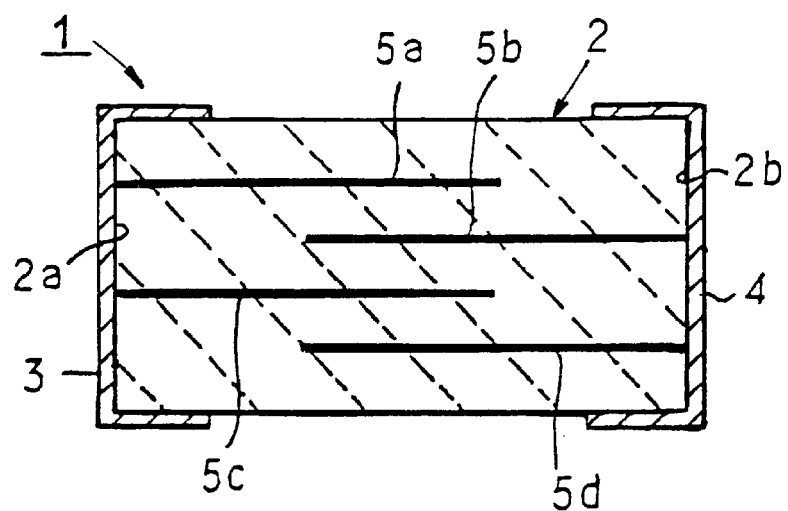
FIG. 1 is a cross-sectional schematic view for depicting a laminated capacitor serving as an electronic element to which the present invention is applied.

Each of the above-described conductive pastes was applied to side faces 2a, 2b of a ceramic body 2 serving as an electronic element of a laminated ceramic capacitor 1 which is schematically illustrated in FIG. 1, so that the thickness of the coating layer after firing became approximately 50 μm. The paste was burned to thereby form external electrodes 3, 4 of the laminated ceramic capacitor 1. In FIGS. 1, 5a through 5d refer to internal electrodes, which in this case are formed of Ni.

Firing to form the external electrodes was performed in a tunnel furnace having a first portion serving as a resin-firing portion and a second portion serving as a sintering portion and under the following conditions: all steps were completed in 30 minutes, and a maximum temperature of 850° C. was maintained for two minutes. The oxygen concentration in the tunnel furnace was 10 ppm in the resin-firing section and 100 ppm in the sintering section.

Figure 2:
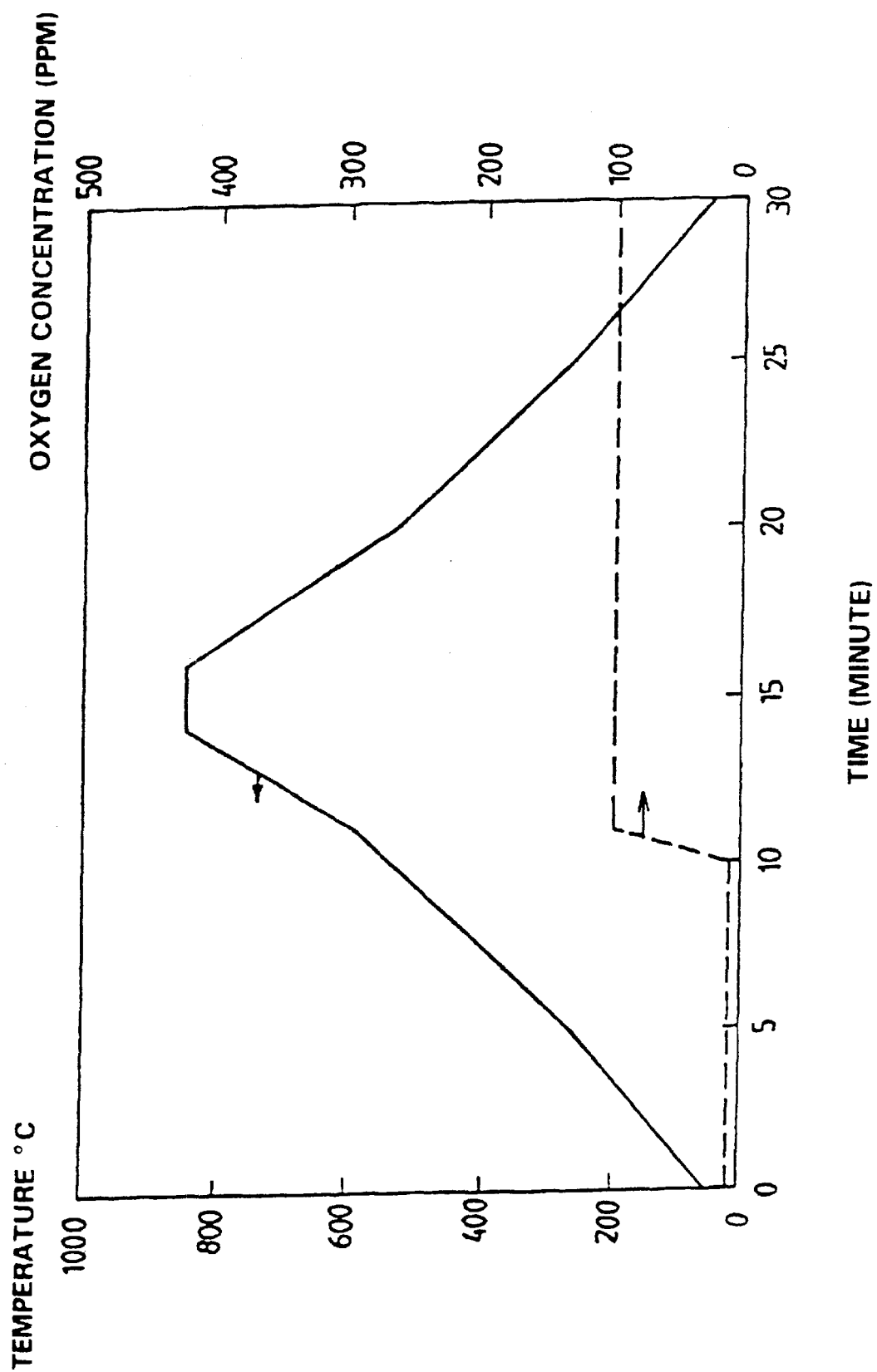
FIG. 2 is a graph showing temperature and oxygen concentration profiles during the firing step of the conductive paste conducted in the relevant Example.

The temperature profile and the oxygen concentration profile during the firing step in the tunnel furnace are shown in FIG. 2.

Each of the laminated ceramic capacitors on which the external electrodes 3, 4 were formed in the above-described manner, were evaluated for (1) electrostatic capacity, (2) bonding property with the internal electrodes, (3) density of the external electrodes, and (4) change in insulation resistance under moist conditions. In this case, (2) bonding property with internal electrodes, (3) density of external electrodes, and (4) change in insulation resistance under moist conditions were evaluated by the following methods.

(2) Bonding property with internal electrodes: Each of the laminated ceramic capacitors was cut in a direction normal to external electrode faces and the cross-section was observed under a microscope. When Ni and Cu are mutually diffused to form a continuous state, the bonding property is evaluated as "good," and indicated by O in Table 2 shown below, whereas when a discrete state is observed, the property is evaluated as "inappropriate" and indicated by X in Table 2 shown below.

(3) Density of the external electrodes: As in the case of (2), bonding property with internal electrodes, each of the laminated ceramic capacitors was cut in a direction normal to external electrode faces and the cross-section was observed under a microscope. When the porosity is 10% or less, the density of the external electrodes is evaluated as "good" and indicated by O in Table 2 shown below, whereas when the porosity is 10% or more, the property is evaluated as "inappropriate" and indicated by X in Table 2 shown below.

(4) Change in insulation resistance under moist conditions: The laminated ceramic capacitors were allowed to stand for 100 hours at 125° C., 2 atm and a relative humidity of 100%. Then, the insulation resistance was measured by application of a voltage of 2 V to determine whether insulation resistance decreased to $10^6$ Ω or less from the value before leaving under the moist conditions. For each sample, 30 laminated ceramic capacitors were evaluated, and the number of the capacitors having an insulation resistance of $10^6$ Ω or less is shown in Table 2 shown below.

Figure 3:
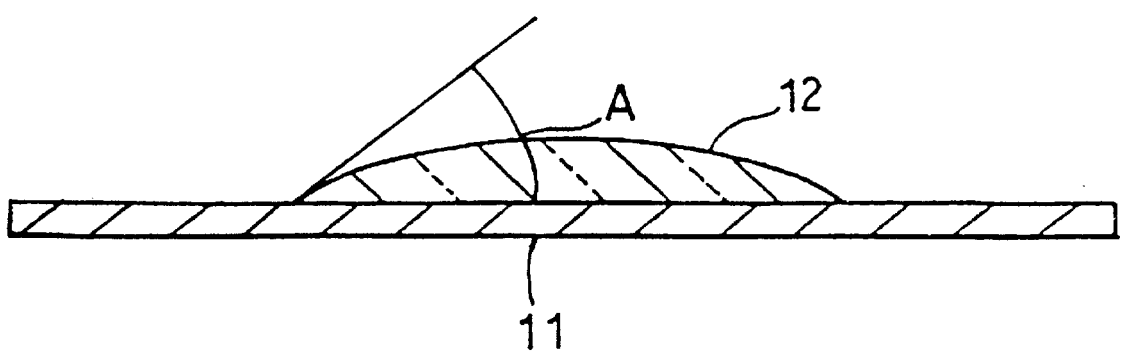
FIG. 3 is a side view for depicting a method for measuring a contact angle of glass with respect to a Cu plate.

The wettability of glass frit used in the conductive pastes of the Sample Nos. 1 through 9 to Cu was evaluated in the following manner. The glass frit used in the conductive pastes of the Sample Nos. 1 through 10 (60 wt. %), the above-described organic vehicle (40 wt. %) and a solvent were kneaded to prepare pastes, which were applied to the surface of a Cu plate through printing in a thickness of 20 μm and fired under the same conditions as those for firing the above-described external electrodes, to there by obtain samples. The contact angle between the glass and the Cu plate was measured for these samples. As shown in FIG. 3, the above-described glass paste was applied to a Cu plate 11 through printing and was fired, to thereby solidify the paste, and the contact angle A of the solidified glass 12 with respect to the Cu plate 11 was measured in a nitrogen atmosphere. The results are shown in Table 2 shown below.

TABLE 2

| Sample No. | Contact angle A (°) | Electrostatic capacity (μF) | Bonding property with respect to internal electrodes | Density of external electrodes | Change in insulation resistance |
|---|---|---|---|---|---|
| 1 | 110 | 0.85 | X | X | 4/30 |
| 2 | 90 | 1.05 | ○ | ○ | 0/30 |
| 3 | 55 | 1.05 | ○ | ○ | 0/30 |
| 4 | 28 | 1.03 | ○ | ○ | 0/30 |
| 5 | 35 | 1.04 | ○ | ○ | 0/30 |
| 6 | 30 | 1.06 | ○ | ○ | 0/30 |
| 7 | 55 | 0.78 | X | ○ | 0/30 |
| 8 | 25 | 1.02 | ○ | ○ | 0/30 |
| 9 | 27 | 1.05 | ○ | ○ | 0/30 |

As is clear from Table 2, Sample No. 1 has a large contact angle of 110° due to the absence of CuO. The sample shows a poor contacting property with respect to internal electrodes and poor density of the external electrodes and also a considerably high ratio of deterioration of the insulation resistance under moist conditions, possibly due to the large contact angle. In contrast, Sample Nos. 2 through 6, 8 and 9 have contact angles with respect to the Cu plate of 90° or less. The samples show a good bonding property with the internal electrodes and density of the external electrode films, and no deterioration of the insulation resistance under moist conditions.

Sample No. 7 shows a poor contacting property with respect to the internal electrodes, possibly due to the ZnO content being as low as 1 mol %; however, it shows excellent density of the external electrode films and no deterioration of the insulation resistance under moist conditions.

While the invention has been particularly shown and described with reference to preferred embodiments thereof, it will be understood by those skilled in the art that the forgoing and other changes in form and details may be made therein without departing from the spirit of the invention.

What is claimed is:

1. An electronic element comprising:

an electronic element body having at least one internal electrode; and at least one external electrode on an outer surface of the electronic element body electrically connected to the internal electrode, wherein the external electrode comprises copper and a Zn- and Cu-containing borosilicate glass having a contact angle in the melt state with respect to Cu of 90° or less measured in a nitrogen atmosphere.

2. The electronic element of claim 1 in which the internal electrode comprises Cu or Ni.

3. The electronic element of claim 1 in which the internal electrode comprises a metal which forms an alloy with copper.

4. The electronic element of claim 1 having a plurality of internal electrodes and at least two of said external electrodes.

5. The electronic element of claim 4 wherein the electronic element body comprises a plurality of layers and each internal electrode is disposed between adjacent ones of said layers.

6. The electronic element of claim 5 in which the internal electrode comprises Cu or Ni.

7. The electronic element of claim 6 in which the amount of Zn in the glass frit calculated as ZnO is about 2–40 mol %, and the amount of Cu in the glass frit calculated as CuO allows vitrification and is at least about 0.2 mol %.

8. The electronic element of claim 1 in which the amount of Zn in the glass frit calculated as ZnO is about 2–40 mol %, and the amount of Cu in the glass frit calculated as CuO allows vitrification and is at least about 0.2 mol %.

* * * * *